United States Patent [19]
Duprez

[11] 3,924,308
[45] Dec. 9, 1975

[54] HOSE CLAMP COMPRISING A ONE-PIECE BAND AND HOUSING

[75] Inventor: Wayne R. Duprez, West Newton, Mass.

[73] Assignee: Standard-Thomson Corporation, Waltham, Mass.

[22] Filed: May 8, 1974

[21] Appl. No.: 467,869

[52] U.S. Cl. ............................................... 24/274 R
[51] Int. Cl.² ........................................... B65D 63/02
[58] Field of Search ....... 24/274 R, 274 WB, 274 P, 24/274

[56] References Cited
UNITED STATES PATENTS

| | | | |
|---|---|---|---|
| 1,776,850 | 9/1930 | Cheswright | 24/274 R |
| 2,452,806 | 11/1948 | Tetzlaff | 24/274 R |
| 3,195,204 | 7/1965 | McKown | 24/274 R |
| 3,371,392 | 3/1968 | Rueckheim | 24/274 R |
| 3,605,213 | 9/1971 | Turner | 24/274 R |

FOREIGN PATENTS OR APPLICATIONS 1,379,782  10/1964  France ........................ 24/274 WB

*Primary Examiner*—Donald A. Griffin
*Attorney, Agent, or Firm*—Jacox & Meckstroth

[57] ABSTRACT

A hose clamp which comprises an integral strip which forms both a band portion and a screw housing portion. The housing portion of the unit supports a clamping screw, and the housing portion is adapted to receive a part of the band for adjustment of the effective diameter of the band.

30 Claims, 10 Drawing Figures

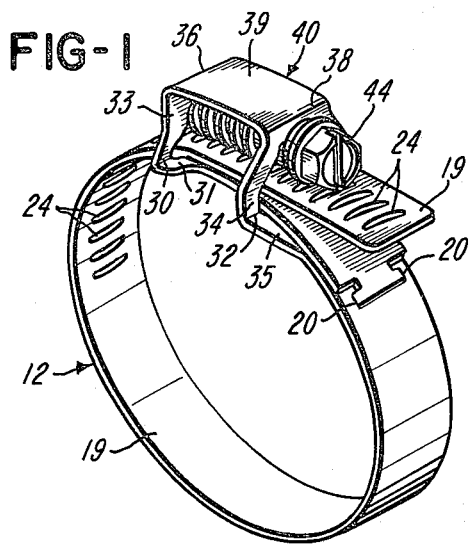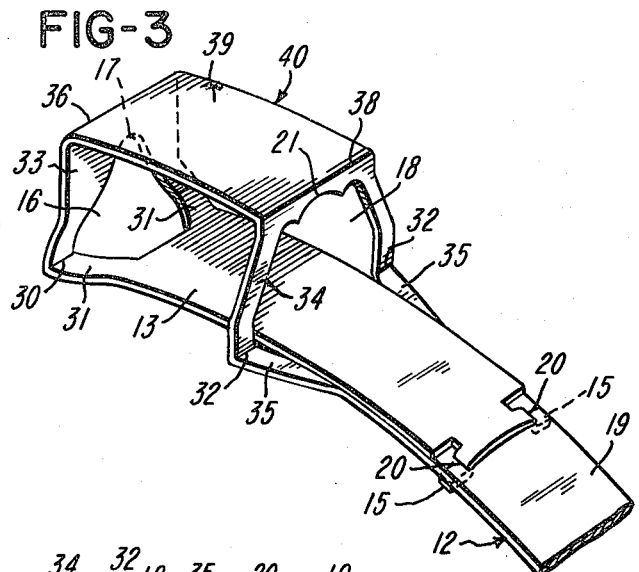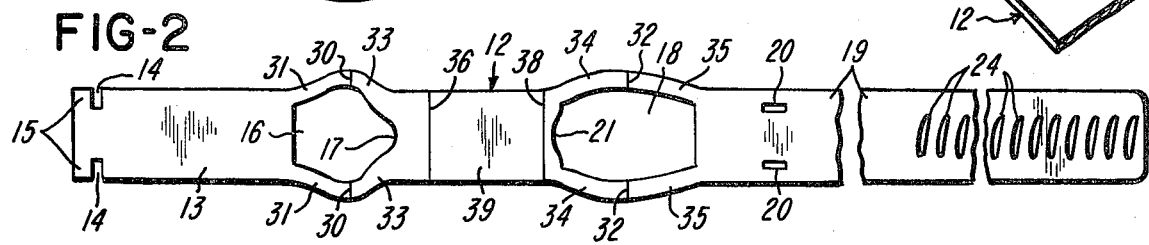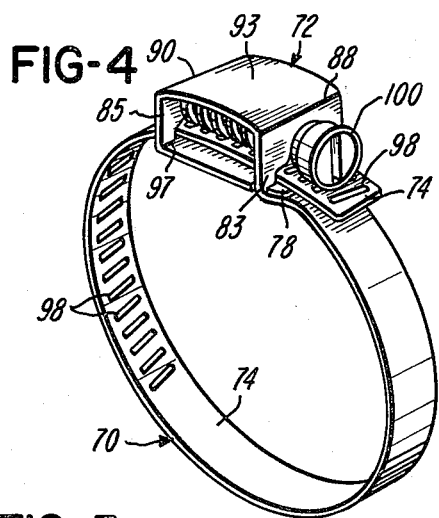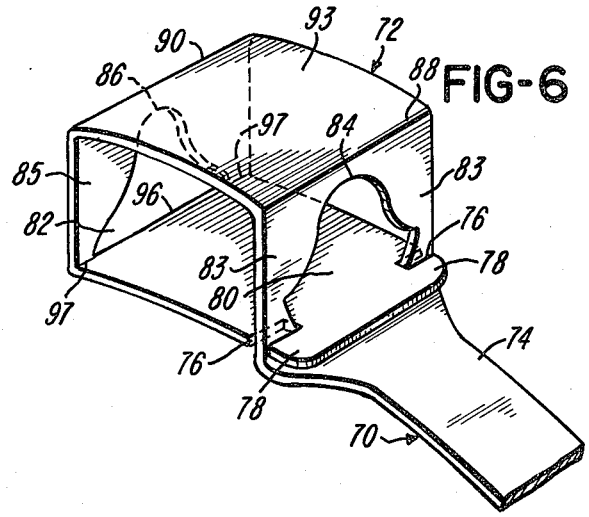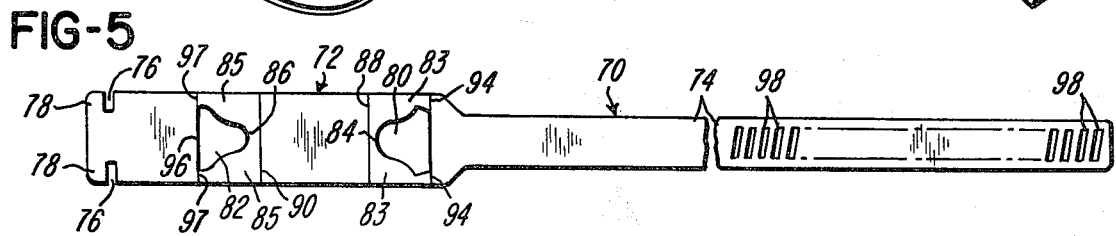

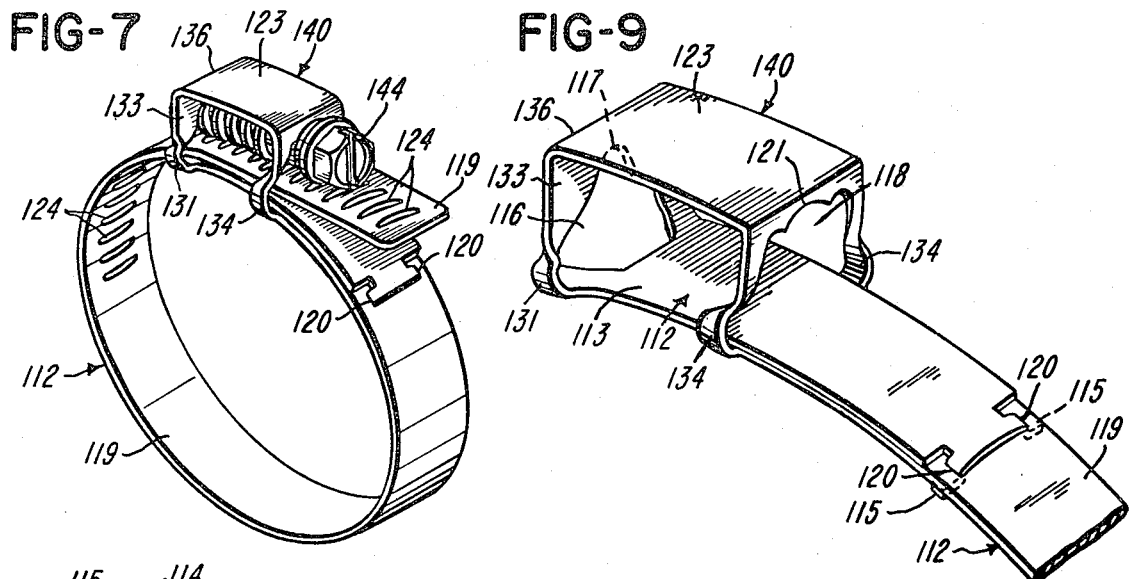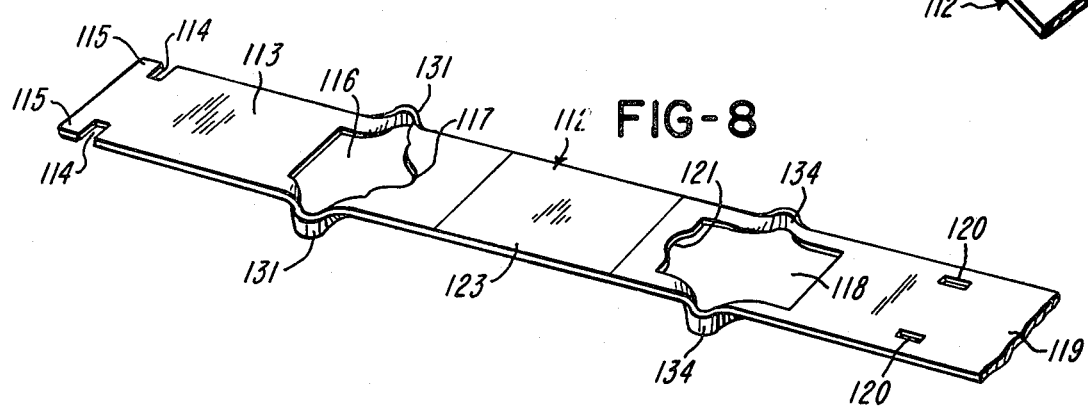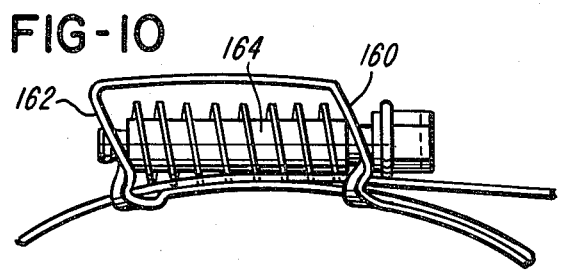

HOSE CLAMP COMPRISING A ONE-PIECE BAND AND HOUSING

BACKGROUND OF THE INVENTION

Numerous types of hose clamps have been designed. One type of hose clamp is a worm gear type of hose clamp. A few of the worm gear type of hose clamps have the band and housing constructed of a single element, but such hose clamps have been relatively expensive to produce and have involved considerable waste material.

Furthermore, known worm gear hose clamps frequently fail in the housing portion thereof, resulting in release of clamping forces. Also, worm gear housings of known hose clamps frequently become clogged with dirt or other foreign material so that rotative movement of the clamping screw is prevented or very difficult.

It is an object of this invention to provide a worm gear type of hose clamp in which the band and the screw housing are integral.

It is another object of this invention to provide a hose clamp in which the band and screw housing are formed of a strip of material which initially may have the same width throughout its length.

It is another object of this invention to provide such a hose clamp which can be constructed at relatively low costs in a multiplicity of sizes.

It is another object of this invention to provide such a hose clamp in which the housing is open on the sides thereof and in which foreign material in the housing is automatically dislodged therefrom as the worm or screw is rotated.

It is another object of this invention to provide such a worm type hose clamp in which the worm is urged toward the band when high clamping pressures exist, so that the loosening of the worm under vibration conditions or the like is prevented.

It is another object of this invention to provide such a hose clamp in which ultimate failure in the clamp occurs in the band portion thereof, rather than in the housing portion thereof. Thus, excellent clamping forces exist until the magnitude of the clamping forces becomes very high.

Other objects and advantages of this invention reside in the construction of parts, the combination thereof, the method of manufacture, and the mode of operation thereof, as will become more apparent from the following description.

BRIEF DESCRIPTION OF THE VIEWS OF THE DRAWING

FIG. 1 is a perspective view of a hose clamp of this invention.

FIG. 2 is a layout plan view, with parts broken away, of the band and housing portion of a hose clamp of this invention.

FIG. 3 is an enlarged fragmentary perspective view, illustrating a succeeding step in formation of a hose clamp of this invention.

FIG. 4 is a perspective view, drawn on substantially the same scale as FIG. 1, of another hose clamp of this invention.

FIG. 5 is a layout plan view, with parts broken away, of the band and housing portion of the hose clamp of FIG. 4.

FIG. 6 is an enlarged fragmentary perspective view illustrating a step in the formation of the hose clamp of FIGS. 4 and 5.

FIG. 7 is a perspective view, similar to FIGS. 1 and 4 illustrating a modification of the embodiment of the hose clamp structure of FIGS. 1, 2 and 3.

FIG. 8 is a fragmentary perspective type of layout view illustrating a step in the formation of the hose clamp of FIG. 7.

FIG. 9 is an enlarged fragmentary perspective view illustrating a succeeding step in the formation of the hose clamp of FIG. 7.

FIG. 10 is a fragmentary side elevational view of hose clamp structure of this invention, illustrating movement of portions of the housing which occurs when high clamping forces are created within the structure.

DETAILED DESCRIPTION OF THE PREFERRED EMBODIMENTS

The band and screw housing of the hose clamp illustrated in FIGS. 1, 2, and 3 is formed of a strip of material which is initially of substantially uniform width. The strip of material may be of metal or of any other suitable material. FIG. 2 shows an early step in the formation of the band and housing. A strip 12, as shown in FIG. 2, is originally of a substantially constant width. A pair of transverse notches 14 are formed in one end of a floor portion 13 of the strip 12 to provide tabs 15. An opening 16 and an opening 18 are formed in spaced-apart relationship in the strip 12. The opening 16 has an arcuate part 17, and the opening 18 has an arcuate part 21. A pair of apertures 20 are formed in the strip 12 between the opening 18 and a band portion 19. The band portion 19 has a series of substantially parallel slots or teeth 24, formed in the strip 12, adjacent the end of the strip 12.

The portions of the strip 12 at the sides of the openings 16 and 18 are spread apart, as illustrated in FIG. 2, to provide openings larger than the width of the other parts of the strip 12. Score lines 30 are formed in the strip 12 adjacent the opening 16, and score lines 32 are formed in the strip 12 adjacent the opening 18. Thus, webs 31 and 33 are provided at the sides of the opening 16, and webs 34 and 35 are provided at the sides of the opening 18. Between the openings 16 and 18 transverse score lines 36 and 38 are formed and extend across the strip 12. Between the score lines 36 and 38 is a connector portion 39.

The strip 12 is bent at the score lines 30, 36, 38, and 32 to the shape illustrated in FIG. 3. Thus, the webs 33 are bent at substantially right angles to the webs 31, and the webs 34 are bent at substantially right angles to the webs 35. Also, the connector portion 39 is positioned substantially at right angles to the webs 33 and 34. The floor portion 13 of the strip 12 extends substantially coplanar with the webs 31, and extends through the opening 18 and beyond the opening 18. The tabs 15 are bent downwardly and passed through the apertures 20 and then bent against the strip 12, as illustrated in FIG. 3, to secure the position of the floor portion 13. Thus, a housing 40 is formed.

Then, a worm or screw 44 is placed within the housing 40, with portions of the worm or screw 44 located within the arcuate parts 17 and 21 of the openings 16 and 18, respectively. Then the band portion 19 of the strip 12 is bent arcuately and moved into the housing 40 through the opening 16, and the teeth or slots 24 are positioned to receive threads of the worm screw 44, as shown in FIG. 1. Thus, a hose clamp of a given diameter is formed. As the worm or screw 44 is rotated, the band portion 19 is moved with respect to the housing 40 to cause the diameter of the hose clamp to become greater or smaller for clamping or unclamping a hose.

FIGS. 4, 5 and 6

The hose clamp embodiment illustrated in FIGS. 4, 5, and 6 is similar to the embodiment of FIGS. 1, 2 and 3, in that the hose clamp has a band and a housing which are integral.

FIG. 5 shows a strip 70 which has a housing portion 72 and a band portion 74. The housing portion 72 has a width dimension greater than the width dimension of the band portion 74. The end of the housing portion 72 has a pair or notches 76 which provide tabs 78. The housing portion 72 is provided with openings 80 and 82. Webs 83 form the sides of the opening 80 and webs 85 form the sides of the opening 82. The opening 80 has an arcuate portion 84, and the opening 82 has an arcuate portion 86.

Between the openings 80 and 82 are a score line 88 and score line 90. Between the score lines 88 and 90 is a connector portion 93. A score line 94 extends across the housing portion 72 at one end of the opening 80, and a score line 97 extends across the housing portion 72 at one end of the opening 82. The opening 82 has a straight portion 96 which has a score line 97 in alignment therewith.

At the end of the band portion 74 is a series of teeth or slots 98. The strip 70 is bent at the score lines 97, 90, 88, and 94, so that the housing portion 72 assumes a housing shape such as that shown in FIG. 6, with the openings 82 and 80 at the ends of the housing. The webs 83 and 85 are at right angles to the connector portion 93. The portion of the housing 72 which has the tap 78 is bent at the score line 97 and inserted through the opening 80. The tabs 78 are moved to permit a part of the webs 83 to be positioned within the notches 76, as shown in FIG. 6.

Then, a worm screw 100 is positioned within the housing portion 72 and parts of the worm screw 100 are located within the arcuate portions 86 and 84 of the openings 82 and 80, respectively.

Then, the part of the band portion 74 which has the teeth or slots 98 is moved into the housing 72 through the opening 82, and the slots 98 are positioned to receive the threads of the worm or screw 100. Thus, a hose clamp of a given diameter is formed, as shown in FIG. 4. As the worm screw 100 is rotated, the threads thereof within the slots 98 of the band portion 74 cause the diameter of the hose clamp to be greater or less for clamping or unclamping with respect to a hose.

FIGS. 7, 8 and 9

FIGS. 7, 8, and 9 illustrate a modification of the embodiment of FIGS. 1, 2 and 3. The hose clamp of FIGS. 7, 8 and 9 is formed of a strip of material which is initially of substantially constant width. FIG. 8 illustrates an early step in the formation of the band and housing. A strip 112, as shown in FIG. 8, is originally of a substantially constant width. A pair of transverse notches 114 are formed in one end of a floor portion 113 of the strip 112 to provide tabs 115. An opening 116 and an opening 118 are formed in spaced-apart relationship in the strip 112. The openings 116 and 118 are separated by a connection portion 123. The opening 116 has an arcuate part 117, and the opening 118 has an arcuate part 121. A pair of apertures or slots 120 are formed in the strip 112 between the opening 118 and a band portion 119. The band portion 119 has a series of substantially parallel slots or teeth 124, formed in the strip 112, adjacent the end thereof.

A portion of the strip 112 at the sides of the openings 116 and 118 are spread apart to form webs 131 and 134 at the sides of the openings 116 and 118, respectively, as illustrated in FIG. 8. Thus, openings having a width greater than the widths of the other parts of the strip are formed. The webs 131 and 134 are twisted slightly as they are spread apart so that parts of the webs 131 and 134 are substantially parallel with the edges of the band portion 119. Thus, the lateral movement of each pair of the webs 131 and 134 does not need to be great to provide the openings 116 and 118. Furthermore, the angular formation of the webs 131 and 134 permits the webs 131 and 134 to be relatively strong and rigid.

The strip 112 is bent to the shape shown in FIG. 9, as the webs 131 and 134 are bent at substantially right angles to the connector portions 123. The tabs 115 are bent downwardly and pass through the apertures or slots 120 and then are bent against the strip 112, as illustrated in FIGS. 7 and 9, to secure the position of the floor portion 113. Thus, a housing 140 is formed.

Then, a worm or screw 144 is placed within the housing 140, with portions of the worm or screw 144 located within the arcuate parts 117 and 121 of the openings 116 and 118. Then the band 119 of the strip 112 is bent arcuately and moved into the housing 140 through the opening 116, and the teeth or slots 124 are positioned to receive threads of the worm or screw 144, as shown in FIG. 7. Thus, a hose clamp of a given diameter is formed. As the worm or screw 144 is rotated, the band portion 119 is moved with respect to the housing 140 to cause the diameter of the hose clamp to become greater or smaller for clamping or unclamping a hose.

Due to the fact that the housing portion of a hose clamp of this invention is open at the sides thereof, dirt and other foreign material which becomes lodged within the housing, as the hose clamp serves a clamping function, is readily dislodged from the housing by rotative movement of the screw or worm within the housing.

FIG. 10

FIG. 10 illustrates the manner in which web portions 160 and 162 of a hose clamp of this invention move angularly as high clamping forces are experienced in the hose clamp. When the web portions 160 and 162 move angularly, as illustrated in FIG. 10, a clamping screw 164 within the housing is urged toward the portion of the band within the housing and the threads of the screw 164 become more firmly positioned within teeth or slots of the band. Thus, as increased clamping pressures are experienced in a hose clamp of this invention, a worm or screw which is used in adjusting and securing the diameter of the hose clamp becomes more firmly positioned to retain the adjusted diameter of the hose clamp.

Due to the fact that increased pressure of screw engagement occurs as clamping pressures increase in a hose clamp of this invention, the first portion of the hose clamp to fail under increasing clamping forces is the band portion, rather than the housing portion. Therefore, very high clamping pressures may be applied by a hose clamp of this invention prior to failure thereof.

Thus, it is understood that a hose clamp of this invention has an integral band portion and housing portion, with a screw within the housing portion. Thus, a hose clamp, of this invention can be constructed at relatively low cost, while the hose clamp of this invention is durable, strong, and long lived.

Although the preferred embodiments of the hose clamp of this invention have been described, it will be understood that within the purview of this invention various changes may be made in the form, details, proportion and arrangement of parts, the combination thereof and methods of production, which generally stated consist in structure and methods capable of carrying out the objects set forth, as disclosed and defined in the appended claims.

The invention having thus been described, the following is claimed:

1. A hose clamp comprising a strip of material having a housing portion and an integral band portion, the housing portion having a pair of spaced-apart openings therein providing an opening adjacent each end of the housing, a floor portion integral with the housing portion and extending from one opening through the other opening, a screw having a threaded portion within the housing, the band portion having a series of slots, with a part of the band portion within the housing and with parts of the threads of the screw within some of the slots, so that rotative movement of the screw causes movement of the threads within the slots and causes movement of the band portion within the housing portion.

2. The hose clamp of claim 1 in which the strip of material is substantially of the same width dimension throughout the length thereof.

3. The hose clamp of claim 1 in which the strip of material has a greater width dimension at the housing portion thereof than at the band portion thereof.

4. The hose clamp of claim 1 in which the floor portion has a part which is attached to the housing.

5. The hose clamp of claim 1 in which the floor portion has a part which is attached to the band portion.

6. In a hose clamp including an elongate metal strip of sheet material having a first end portion defining a plurality of longitudinally spaced teeth, a worm having a helical flight for engaging said teeth, and means for engaging said worm to effect rotation of said worm, the improvement wherein said metal strip of sheet material includes a second integral end portion having a first outwardly projecting web portion and a second outwardly projecting web portion integrally connected by a connector portion, means defining an opening within each of said web portions, an inner floor portion extending integrally from one of said web portions generally parallel to said connector portion, means for connecting said floor portion to another part of said strip, said worm being positioned between said connector portion and said floor portion and being rotatably supported by said web portions, said openings being of sufficient size to receive said first end portion of said strip to provide for engagement of said helical flight with said teeth.

7. In the hose clamp of claim 6 in which the floor portion extends from the first web portion and extends through the opening in the second web portion.

8. In a hose clamp comprising an elongate metallic strip having a housing portion and a band portion, the portions being integral aligned parts of the strip with a juncture in which an end of the housing portion is joined to an end of the band portion, the housing portion having a pair of openings, each of the openings having side web portions, there being a connector portion located between the openings, the housing portion being bendable so that at least parts of the web portions are substantially at right angles to the connector portion, the housing portion having an attachment portion opposite said juncture, the band portion being bendable toward the housing portion and movable into the housing portion through an opening in the housing portion.

9. The hose clamp of claim 8 in which the spacing between opposed web portions of each opening is greater than the width of any other part of the strip, so that any other part of the strip is movable through each opening.

10. The hose clamp of claim 8 in which the housing portion of the strip along the length thereof has a width which is greater than the width of the band portion along the length thereof.

11. The hose clamp of claim 8 in which the attachment portion has a part which is attachable to the band portion.

12. The hose clamp of claim 8 in which the attachment portion has a part which is attachable to the housing portion adjacent said juncture.

13. A hose clamp comprising a single strip of material in which all parts thereof are integral, including a housing portion and a band portion, the housing portion being provided with a pair of openings, each of which has a web portion at each side thereof and a connector portion between the openings, a floor portion parallel to the connector portion, at least a part of the web portions being at right angles to the floor portion and at right angles to the connector portion, a part of the band portion being within the housing portion, and means within the housing portion between the connector portion and the floor portion and engageable with said part of the band which is within the housing for movement of said part of the band with respect to the housing portion.

14. The method of producing a hose clamp comprising the steps of forming a strip of material into a band portion and a housing portion; forming a plurality of openings in the housing portion in spaced-apart sections thereof so that web portions are produced at the sides of the openings, forming a series of teeth in the band portion; bending the strip so that parts of the web portions extend angularly from the band portion; positioning a threaded screw within the housing portion; bending the band portion arcuately so that a part of the band portion extends through one of the openings and is positioned within the housing portion, with a part of the threads of the threaded screw in mesh with some of the teeth of the band portion.

15. The method of claim 14 which includes forming the strip of material so that the strip includes an integral floor portion.

16. The method of claim 15 which includes bending the floor portion with respect to the web portions and attaching the floor portion to the band portion.

17. The method of claim 15 which includes bending the floor portion with respect to the web portions and attaching the floor portion to the housing portion.

18. The method of claim 15 which includes providing an aperture in the band portion and providing a tab in the floor portion; positioning the tab in the aperture of the band portion to attach the floor portion to the band portion.

19. The method of claim 14 which includes widening the band at the sections thereof which have the openings.

20. The method of claim 14 which includes forming the strip of material so that the band portion along the length thereof has a width dimension different from the width dimension of the housing portion along the length thereof.

21. The method of claim 14 which includes twisting the webs so that parts thereof are somewhat parallel to the side edges of the band portion.

22. In a hose clamp including an elongate sheet metal strip having a first end portion defining a plurality of longitudinally spaced teeth, a worm having a helical flight for engaging said teeth, and means for engaging said worm to effect rotation thereof, the improvement wherein said sheet metal strip includes a second integral end portion having at least one opening for receiving said first end portion of said strip, and wherein said second portion of said strip also forms a rotatable support for said worm in a position to engage said flight on said first end portion of said strip, each opening being formed by a pair of webs which have a laterally spaced-apart dimension greater than the width portion of any other portion of the strip.

23. The hose clamp of claim 22 in which each of the webs has portions thereof which are twisted slightly and at angles which are different from other portions of the strip.

24. A hose clamp comprising an elongate strip having a first integral end portion provided with a series of teeth, and a second integral end portion, the second integral end portion of the strip being longitudinally aligned with the first integral end portion of the strip, there being an aperture in the second integral end portion of the elongate strip, the second integral end portion of the strip including a longitudinally extending support portion, the first integral end portion of the elongate strip extending through said aperture in the second integral end portion of the elongate strip, a screw rotatably supported at opposed ends thereof by the longitudinally extending support portion of the second integral end portion of the elongate strip, the screw having a threaded portion which is engageable with the teeth of the first integral end portion of the elongate strip when the first integral end portion of the elongate strip extends through said aperture in the second integral end portion for adjusting the position of the first integral end portion of the elongate strip with respect to the screw, the support portion of the second integral end portion including a housing having a pair of apertures, there being an aperture at each end of the housing and a floor portion extending between the apertures, the first integral end portion extending into the housing through one of the apertures and being movable through the other aperture, the housing including a pair of webs forming each aperture, the webs which form each aperture having a spaced-apart dimension greater than the width portion of any other portion of the strip.

25. In a hose clamp including an elongate sheet metal strip having a first end portion defining a plurality of longitudinally spaced teeth, a worm having a helical flight for engaging said teeth, means for engaging said worm to effect rotation thereof, a housing formed as an integral part of said strip and having an aperture for receiving said first end portion of said strip, and said housing having means for rotatably supporting said worm, the improvement wherein a longitudinally extending section of said strip is formed back upon itself in a longitudinal direction to define said housing, said longitudinally extending section has longitudinally spaced strip portions forming opposite end walls of said housing, and said end walls confine at least a portion of said worm with said worm extending axially between said end walls.

26. In a clamp including an elongate sheet metal strip having a first end portion defining a plurality of longitudinally spaced teeth, a worm having a helical flight for engaging said teeth, means for engaging said worm to effect rotation thereof, a housing formed as an integral part of said strip and having an aperture for receiving said first end portion of said strip, and said housing having means for rotatably supporting said worm, the improvement wherein a longitudinally extending section of said strip is formed back upon itself in a longitudinal direction to define said housing, said longitudinally extending section has longitudinally spaced strip portions forming opposite end walls of said housing, said end walls confine at least a portion of said worm with said worm extending axially between said end walls, and at least one of said strip portions defines said aperture for receiving said first end portion of said strip.

27. In a hose clamp including an elongate sheet metal strip having a first end portion defining a plurality of longitudinally spaced teeth, a worm having a helical flight for engaging said teeth, means for engaging said worm to effect rotation thereof, a housing formed as a integral part of said strip and having an aperture for receiving said first end portion of said strip, and said housing having means for rotatably supporting said worm, the improvement wherein a longitudinally extending section of said strip is formed back upon itself in a longitudinal direction to define said housing, said longitudinally extending section has longitudinally spaced strip portions forming opposite end walls of said housing, said end walls confine at least a portion of said worm with said worm extending axially between said end walls and said longitudinally extending section of said strip has a substantially uniform width greater than the width of any other portion of the strip.

28. The hose clamp of claim 27 wherein one of said strip portions defines said aperture for receiving said first end portion of said strip.

29. In a hose clamp including an elongate sheet metal strip having a first end portion defining a plurality of longitudinally spaced teeth, a worm having a helical flight for engaging said teeth, means for engaging said worm to effect rotation thereof, a housing formed as an integral part of said strip and having an aperture for receiving said first end portion of said strip, and said housing having means for rotatably supporting said worm, the improvement wherein a longitudinally extending section of said strip is formed back upon itself in a longitudinal direction to define said housing, said longitudinally extending section has longitudinally spaced strip portions forming opposite end walls of said housing, said end walls confine at least a portion of said worm with said worm extending axially between said end walls, and at least one of said end walls has laterally expanded web portions defining said aperture for receiving said first end portion of said strip.

30. The hose clamp of claim 29 wherein said worm has a portion within said aperture and is rotatably supported therein.

* * * * *